(12) United States Patent
Jeong et al.

(10) Patent No.: US 11,701,949 B2
(45) Date of Patent: Jul. 18, 2023

(54) SYSTEM AND METHOD FOR HUMIDIFYING FUEL CELL ELECTRIC VEHICLE

(71) Applicants: Hyundai Motor Company, Seoul (KR); Kia Corporation, Seoul (KR)

(72) Inventors: Seong Bin Jeong, Gyeonggi-do (KR); Albert Biermann, Gyeonggi-do (KR); Moo Sang Kim, Gyeonggi-do (KR); Tae Hun Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 7 days.

(21) Appl. No.: 17/501,636

(22) Filed: Oct. 14, 2021

(65) Prior Publication Data

US 2022/0324299 A1 Oct. 13, 2022

(30) Foreign Application Priority Data

Apr. 13, 2021 (KR) .................. 10-2021-0048106

(51) Int. Cl.
*B60H 3/02* (2006.01)
*B60H 1/00* (2006.01)
*H01M 8/04291* (2016.01)

(52) U.S. Cl.
CPC ......... *B60H 3/022* (2013.01); *B60H 1/00385* (2013.01); *H01M 8/04291* (2013.01); *H01M 2250/20* (2013.01)

(58) Field of Classification Search
CPC ..... B60H 3/022; B60H 1/00385; B60S 1/023; B60S 1/026; H01M 8/04291; H01M 2250/20

See application file for complete search history.

(56) References Cited

U.S. PATENT DOCUMENTS 4,718,244 A * 1/1988 Kobayashi ........... B60H 1/3207
236/44 C
5,466,911 A * 11/1995 Spagnoli .................. H05B 3/84
219/203

(Continued)

FOREIGN PATENT DOCUMENTS

JP 03079975 * 4/1991
JP 09156360 A * 6/1997

(Continued)

*Primary Examiner* — Marc E Norman
(74) *Attorney, Agent, or Firm* — Fox Rothschild LLP

(57) ABSTRACT

A system for humidifying a vehicle that is a fuel cell electric vehicle includes a fuel cell stack for producing electrical energy through an electrochemical reaction of hydrogen and oxygen, a water supply tank for storing water generated during electricity generation in the fuel cell stack, a HVAC apparatus for humidifying an interior of the vehicle using the water supplied from the water supply tank, a heater for generating steam by heating the water supplied from the water supply tank, and supplying the steam to the HVAC apparatus, and a controller that determines an operation mode of the system based on at least one of a vehicle state, a HVAC apparatus state, or an indoor temperature of the vehicle, and controls at least one of the HVAC apparatus or the heater based on the determined operation mode to control indoor humidification of the vehicle.

19 Claims, 8 Drawing Sheets

(56) References Cited

U.S. PATENT DOCUMENTS

| | | | |
|---|---|---|---|
| 6,467,698 B2* | 10/2002 | Gaarder | ................. B60H 3/022 165/41 |
| 2018/0029447 A1* | 2/2018 | Kato | .................. B60H 1/00671 |
| 2018/0359815 A1* | 12/2018 | Han | ......................... H05B 3/84 |

FOREIGN PATENT DOCUMENTS

| KR | 20040016317 A | 2/2004 |
|---|---|---|
| KR | 20080046861 A | 5/2008 |
| KR | 20170079566 A | 7/2017 |
| KR | 20190079872 A | 7/2019 |

* cited by examiner

SYSTEM AND METHOD FOR HUMIDIFYING FUEL CELL ELECTRIC VEHICLE

CROSS-REFERENCE TO RELATED APPLICATION

This application claims under 35 U.S.C. § 119(a) the benefit of Korean Patent Application No. 10-2021-0048106, filed in the Korean Intellectual Property Office on Apr. 13, 2021, the entire contents of which are incorporated herein by reference.

BACKGROUND

(a) Technical Field

The present disclosure relates to a humidification system and a method for controlling indoor humidity of a fuel cell electric vehicle.

(b) Description of the Related Art

During cooling or heating of a vehicle, as indoor humidity of the vehicle decreases rapidly, an interior of the vehicle becomes dry, so that a user may feel discomfort, e.g., in the eyes, skin, and the like. To address such a problem, it is possible to use a humidifier in the vehicle. However, when the humidifier is operated, there is a problem in that moisture, frost, or the like is generated on a window glass, obstructing a view of a driver. In addition, there is an inconvenience that the user needs to replenish water by checking a water tank of the humidifier from time to time.

SUMMARY

An aspect of the present disclosure provides a system and method for humidifying a fuel cell electric vehicle configured to control an indoor humidity of the vehicle using water generated during electricity generation in a fuel cell stack.

In addition, another aspect of the present disclosure provides a system and method for humidifying a fuel cell electric vehicle configured to control a heating wire installed on a window glass in an associated manner during indoor humidification to fundamentally block fogging of the window glass resulting from a temperature difference between an interior and an exterior of the vehicle.

In addition, another aspect of the present disclosure provides a system and method for humidifying a fuel cell electric vehicle configured to heat water generated in a fuel cell stack by applying a heater to ameliorate a water drop phenomenon at a location below the vehicle during parking or stopping, and supply steam into the vehicle to adjust an indoor humidity.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for humidifying a vehicle (e.g., a fuel cell electric vehicle) includes a fuel cell stack for producing electrical energy through an electrochemical reaction of hydrogen and oxygen, a water supply tank for storing water generated during electricity generation in the fuel cell stack, a first humidifier for humidifying an interior of the vehicle using the water supplied from the water supply tank, a heating apparatus for applying heat to a vehicle glass, and a controller that performs anti-fogging control of the vehicle glass using the heating apparatus when humidifying the interior of the vehicle.

In one implementation, the heating apparatus may include a transparent heating wire installed on each window glass of the vehicle to generate heat, and a power regulator for adjusting an amount of power supplied to the heating wire.

In one implementation, the controller may determine a target surface temperature based on a difference between a dew point temperature and an outside air temperature, measure a window surface temperature using a surface temperature sensor and compare the window surface temperature with the target surface temperature after operating the heating wire, and start humidification of the interior of the vehicle at a time point when the window surface temperature reaches the target surface temperature.

In one implementation, the controller may variably control the amount of power supplied to the heating wire based on a difference between the window surface temperature and the target surface temperature.

In one implementation, the controller may collect initial sensor data using at least one of an outside air temperature sensor, an indoor temperature sensor, a surface temperature sensor, or a humidity sensor, determine prohibition of operation of a humidification function based on the sensor data, and output a notification notifying that the operation of the humidification function is prohibited when it is determined to prohibit the operation of the humidification function.

In one implementation, the controller may stop an auto defog system, operate the heating wire, and supply a maximum amount of power when the prohibition of the operation of the humidification function is not determined.

In one implementation, the first humidifier may include a water tank for storing the water supplied from the water supply tank, and an ultrasonic generator for generating an ultrasonic wave to decompose the water stored in the water tank.

In one implementation, the system may further include a second humidifier for humidifying the interior of the vehicle in a humidification scheme different from a humidification scheme of the first humidifier, and the second humidifier may include a heater for heating the water supplied from the water supply tank to generate steam.

In one implementation, the controller may determine an operation mode of the system based on at least one of a vehicle state, a heating, ventilation, and air conditioning (HVAC) apparatus state, or an indoor temperature of the vehicle, and control at least one of the first humidifier or the second humidifier based on the determined operation mode to adjust an indoor humidity of the vehicle.

In one implementation, the controller may determine an evaporation drainage mode as the operation mode when a humidification function is in an inactive state during parking and stopping and a water level of the water supply tank exceeds a reference water level, and operate the second humidifier to discharge vaporized steam to the outside.

In one implementation, the controller may determine a heating humidification mode as the operation mode when a humidification function and a heating function are in an active state and the indoor temperature is lower than a target temperature, and operate the second humidifier to supply vaporized steam to the interior of the vehicle.

In one implementation, the controller may determine an ultrasonic humidification mode as the operation mode when a humidification function is in an active state and a heating function is in an inactive state, and operate the first humidifier to humidify the interior of the vehicle.

In one implementation, the controller may determine a hybrid humidification mode as the operation mode when a humidification function is in an active state and the indoor temperature is equal to or higher than a target temperature, and operate the first humidifier and the second humidifier to humidify the interior of the vehicle.

In one implementation, the controller may adjust at least one of a humidification time point or a humidification amount based on an indoor temperature of the vehicle.

In one implementation, the controller may perform control in association with a humidity adjustable apparatus of a HVAC apparatus when an indoor humidity is not able to be maintained at a target humidity by supplying a maximum or minimum amount of humidification, and the humidity adjustable apparatus may include at least one of an inlet door or an air conditioner.

According to another aspect of the present disclosure, a method for humidifying a fuel cell electric vehicle equipped with a humidification system including a water supply tank for storing water generated during electricity generation in a fuel cell stack, a first humidifier for receiving the water from the water supply tank and humidifying an interior of the vehicle, and a heating apparatus for applying heat to a vehicle glass includes controlling, by a controller, humidification of the interior of the vehicle, and performing, by the controller, anti-fogging control of the vehicle glass using the heating apparatus when controlling the humidification.

In one implementation, the performing of the anti-fogging control of the vehicle glass may include operating a heating wire installed on each window glass of the vehicle, measuring a window surface temperature using a surface temperature sensor and comparing the window surface temperature with a target surface temperature after operating the heating wire, starting the humidification of the interior of the vehicle when the window surface temperature reaches the target surface temperature, and variably controlling an amount of power supplied to the heating wire based on a difference between the window surface temperature and the target surface temperature.

In one implementation, the operating of the heating wire may include collecting initial sensor data using at least one of an outside air temperature sensor, an indoor temperature sensor, a surface temperature sensor, or a humidity sensor, determining prohibition of operation of a humidification function based on the sensor data, stopping an auto defog system when the operation of the humidification function is permitted, and supplying a maximum amount of power to the heating wire after the auto defog system is stopped.

In one implementation, controlling the humidification of the vehicle interior may include operating a second humidifier using a humidification scheme different from a humidification scheme of the first humidifier to humidify the interior of the vehicle when a humidification function and a heating function are in an active state and an indoor temperature is lower than a target temperature, operating the first humidifier to humidify the interior of the vehicle when the humidification function is in the active state and the heating function is in an inactive state, and operating the first humidifier and the second humidifier to humidify the interior of the vehicle when the humidification function is in the active state and the indoor temperature is equal to or higher than the target temperature.

In one implementation, controlling the humidification of the interior of the vehicle may include controlling an indoor humidity of the vehicle to be maintained at a target humidity by adjusting a humidification time point and an amount of humidification based on an indoor temperature of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
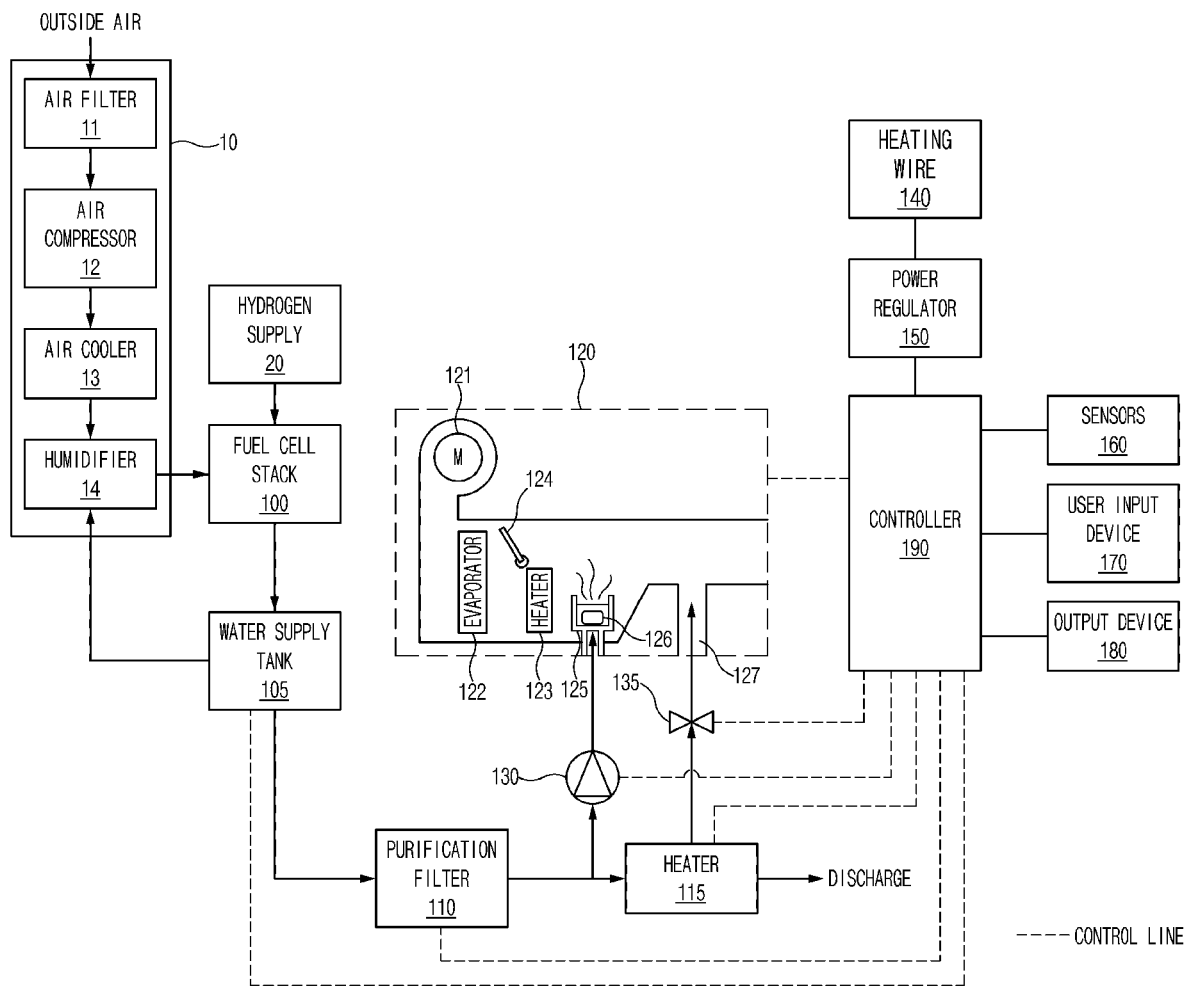
FIG. 1 is a block diagram showing a humidification system of a fuel cell electric vehicle according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram showing a humidification system of a fuel cell electric vehicle according to embodiments of the present disclosure.

Referring to FIG. 1, a humidification system of a fuel cell electric vehicle (FCEV) may include an air supply 10, a hydrogen supply 20, a fuel cell stack 100, a water supply tank 105, a purification filter 110, a heater 115, a heating, ventilation, and air conditioning (HVAC) apparatus 120, a pump 130, a valve 135, a heating wire 140, a power regulator 150, sensors 160, a user input device 170, an output device 180, and a controller 190.

The air supply 10 may suck air from the outside and supply the air to the fuel cell stack 100. The air supply 10 may include an air filter 11, an air compressor 12, an air cooler 13, a humidifier 14, and the like.

The air filter 11 may remove foreign substances, harmful gases, and the like contained in the air sucked from the outside. A chemical filter may be used as the air filter 11.

The air compressor 12 may compress the air that has passed through the air filter 11. The air compressor 12 may include a compressing device, a high-speed motor, and the like. The air compressor 12 may be connected to a power electronics (PE) cooling line to cool heat generated by a motor operation. In this connection, the PE cooling line may be a passage along which cooling water circulating in a PE system flows.

The air cooler 13 may cool the air whose temperature has risen during the compression in the air compressor 12. The air cooler 13 may be located between the air compressor 12 and the humidifier 14 and may be connected to the PE cooling line. The air cooler 13 may cool the heated air using the cooling water circulating in the PE cooling line.

The humidifier 14 may provide moisture (steam) to air supplied to the fuel cell stack 100. The humidifier 14 may humidify the air by reusing water generated from the fuel cell stack 100. The humidifier 14 may be applied to protect an electrolyte membrane of the fuel cell stack 100.

The hydrogen supply 20 may supply hydrogen stored in a hydrogen tank (not shown) to the fuel cell stack 100. The hydrogen supply 20 may adjust an amount of hydrogen supplied to the fuel cell stack 100 by controlling a valve located at an outlet end of the hydrogen tank.

The fuel cell stack 100 may produce electric energy by an electrochemical reaction between the hydrogen supplied from the hydrogen supply 20 and oxygen collected from the outside air. The fuel cell stack 100 may include two catalyst electrodes, that is, an anode (a positive electrode) and a cathode (a negative electrode). When the hydrogen and the oxygen are supplied to the anode and the cathode respectively, the anode may separate the hydrogen into protons, that is, hydrogen ions and electrons. The hydrogen ions may move to the cathode through an electrolyte layer, and the hydrogen ions may be coupled with the oxygen at the cathode to produce water ($H_2O$). The electrons may generate current through an external circuit. The electric energy generated from the fuel cell stack 100 may be stored in a high-voltage battery (not shown) or directly supplied to a driving motor (not shown). The fuel cell stack 100 may discharge (expel) the water produced together with the electrical energy to the outside.

The water supply tank 105 may store the water discharged from the fuel cell stack 100. The water supply tank 105 may include a water level sensor for checking a water level of the water inside the tank. The water supply tank 105 may be connected to the humidifier 14 and the HVAC apparatus 120 by a pipe, a hose, or the like. The water supply tank 105 may supply the water to the humidifier 14 or the HVAC apparatus 120. A valve and/or an ejector may be installed at an outlet of the water supply tank 105. The controller 190 may control the water supply to the humidifier 14 and/or the HVAC apparatus 120 by controlling the valve and/or the ejector of the water supply tank 105.

The purification filter 110 may purify the water discharged from the water supply tank 105. In other words, the purification filter 110 may remove foreign substances and/or harmful substances contained in the water discharged from the water supply tank 105.

The heater 115 may heat the water that has passed through the purification filter 110 to be converted into steam, that is, gas. The heater 115 may supply the vaporized steam to the HVAC apparatus 120 or discharge the steam to the outside through an exhaust pipe.

The HVAC apparatus 120 may adjust a temperature, a humidity, a cleanliness of air, and the like in the vehicle. The HVAC apparatus 120 may include a motor 121, an evaporator 122, a heater 123, a temp door 124, a water tank 125, an ultrasonic generator 126, an inlet 127, and the like.

The motor 121 may drive a fan of a blower to blow outside air (outside air) and/or interior air (inside air) into the vehicle.

The evaporator 122 may evaporate a refrigerant circulating along a refrigerant cycle formed by an operation of a refrigerant compressor during a cooling operation to discharge the refrigerant in a low-pressure and low-temperature gaseous state. In this connection, the refrigerant may absorb heat from a cabin while evaporating. In other words, the evaporator 122 may cool air during the cooling and supply the cooled air into the vehicle.

The heater 123 may receive high-temperature cooling water flowing through a powertrain (PT). The heater 123 may transfer heat to the cabin (a passenger room) using the high-temperature cooling water as a heat source. That is, the heater 123 may heat the air using the cooling water circulating the PT cooling line and supply the heated air into the vehicle.

The evaporator 122 and the heater 123 described above may be collectively referred to as a heat exchanger that adjusts an indoor temperature of the vehicle through a heat exchange process.

The temp door 124 may be mounted to be opened and closed around a hinge point fixed inside the HVAC apparatus 120 to pass the air cooled by the evaporator 122 and/or the air heated by the heater 123 into the vehicle.

The water tank 125 may store the water supplied from the water supply tank 105. A water level sensor (not shown) that senses a water level may be disposed inside the water tank 125.

The ultrasonic generator 126 may be mounted on an inner bottom surface of the water tank 125. The ultrasonic generator 126 may vibrate the water in the water tank 125 to convert the water into fine particles (water particles or water molecules). The ultrasonic generator 126 may include an ultrasonic vibrator, an ultrasonic circuit, and the like. The water tank 125 and the ultrasonic generator 126 may be collectively referred to as an ultrasonic humidifier (a first humidifier).

The pump 130 may be mounted on a connection pipe (e.g., a pipe or a hose) that connects the purification filter 110 with the water tank 125. The pump 130 may pump the water discharged from the water supply tank 105 to supply the water to the water tank 125.

The valve 135 may be installed on a connection pipe that connects the heater 115 with the inlet 127. The valve 135 may adjust an inflow amount of gas vaporized by heating of the heater 115, that is, steam flowing into the HVAC apparatus 120. The valve 135 may be implemented as a two-way valve.

The heating wire 140 may be installed on window glasses of the vehicle, for example, at least one of glasses (vehicle glasses) such as a windshield glass, a side window glass, a rear window glass, or the like. As the heating wire 140, a transparent heating wire and/or a nickel-chromium heating wire may be used. For example, the transparent heating wire may be applied to the windshield glass so as not to interfere with visibility of a driver, and the conventional nickel-chromium heating wire may be applied to the side window glass and the rear window glass.

The power regulator 150 may adjust an amount of power (wattage, electrical energy) supplied to the heating wire 140 in response to an instruction of the controller 190. In the present embodiment, the heating wire 140 and the power regulator 150 may be collectively referred to as a heating apparatus. The heating apparatus may increase a surface temperature of the vehicle glass by applying the heat generated from the heating wire 140 to the vehicle glass.

The sensors 160 may measure a temperature of the outside air, an indoor temperature, a temperature of an inner surface of the window glass (a window surface temperature), and/or an indoor humidity (a relative humidity and/or an absolute humidity). The sensors 160 may include an outside air temperature sensor (an ambient Sensor, AMB sensor), an indoor temperature sensor (an in-car sensor), a surface temperature sensor (an auto defog system (ADS) sensor), and/or a humidity sensor.

The user input device 170 may be a human interface device (HID) that generates data based on a manipulation of a user. For example, the user input device 170 may generate data for turning on or off cooling, heating, and/or humidification functions in response to an input of the user. The user input device 170 may be installed on a steering wheel, a dashboard, a center fascia, and/or a door trim. The user input device 170 may be implemented as a keypad, a button, a switch, a touch pad, and/or a touch screen.

The output device 180 may output information such as visual information, auditory information, and/or tactile information under control of the controller 190. The output device 180 may include at least one of display means such as a liquid crystal display (LCD), an organic light-emitting diode (OLED) display, a head-up display (HUD), a touch screen, a cluster, or the like. The output device 180 may include an audio output device such as a speaker and the like capable of outputting pre-stored audio data, and may include a haptic device that outputs a signal (e.g., vibration) in a form that may be perceived by the user with a sense of touch.

The controller 190 may control overall operations of the humidification system. The controller 190 is a full automatic temperature control (FATC) device. The controller 190 may include at least one processor and a memory. In this connection, the processor may be implemented as at least one of processing devices such as a central processing unit (CPU), a microcontroller, or a microprocessor. The memory may be a non-transitory storage medium that stores instructions executed by the processor. The memory may store various setting information, lookup tables, and the like. The memory may include a hard disk drive (HDD), a solid state disk (SSD), an embedded multimedia card (eMMC), a flash memory, a read only memory (ROM), a programmable read only memory (PROM), an electrically erasable and programmable ROM (EEPROM), and/or an erasable and programmable ROM (EPROM).

The controller 190 may operate the humidification system while power is being supplied to the vehicle. When the operation of the humidification system starts, the controller 190 may determine whether the vehicle is in a parked or stopped state. For example, the controller 190 may determine whether a shift stage is a P-stage while a start button is in an accessory power ON (ACC ON) state or a vehicle power ON state. The controller 190 may determine that the vehicle is in the parked or stopped state when the shift stage is the P-stage in the accessory power ON state or the vehicle power ON state.

The controller 190 may determine whether the humidification function is in an active state when the vehicle is determined to be in the parked or stopped state. The controller 190 may determine whether the water supply tank 105 is filled with the water when the humidification function is in an inactive state. The controller 190 may measure an amount of water (the water level) in the water supply tank 105 using the water level sensor installed in the water supply tank 105. When the measured amount of water exceeds a preset reference value, the controller 190 may determine an evaporation drainage mode (a first mode) as an operation mode of the humidification system.

The controller 190 may determine whether the humidification function is active when the vehicle is traveling or parked or stopped. When the humidification function is in the active state, the controller 190 may determine whether the heating function is in the active state. When the heating function is in the active state, the controller 190 may measure the indoor temperature through the sensors 160, and compare the measured indoor temperature with a preset target indoor temperature (a target temperature). When the measured indoor temperature is lower than the target temperature, the controller 190 may determine a heating humidification mode (a second mode) as the operation mode.

When the humidification function is active and the heating function is inactive during the traveling or the parking or the stopping, the controller 190 may determine an ultrasonic humidification mode (a third mode) as the operation mode. When the indoor temperature measured while the humidification function and the heating function are active during the traveling or the parking or the stopping is equal to or higher than the target temperature, the controller 190 may determine a hybrid humidification mode (a fourth mode) as the operation mode.

When the first mode is determined as the operation mode, the controller 190 may operate the heater 115 to heat the water discharged from the water supply tank 105, thereby generating the steam. The steam vaporized by the heater 115 may be discharged to the outside through the exhaust pipe.

When the second mode is determined as the operation mode, the controller 190 may operate the heater 115 to heat the water discharged from the water supply tank 105 to generate the steam. The heater 115 may supply the steam to the HVAC apparatus 120. Because the HVAC apparatus 120 supplies the steam introduced through the inlet 127 to air blown into the vehicle, the interior of the vehicle may be humidified. The controller 190 may provide heating-type humidification using the heater 115 in the second mode. That is, the heater 115 may operate as a heating humidifier (a second humidifier). When operating in the second mode, the controller 190 may operate the heating wire 140 to prevent moisture from being generated on the window glass.

When the third mode is determined as the operation mode, the controller 190 may operate the ultrasonic humidifier 125 and 126 in the HVAC apparatus 120 to humidify the vehicle interior. In addition, when the fourth mode is determined as the operation mode, the controller 190 may humidify the interior of the vehicle using the heater 115 and the ultrasonic humidifier (first humidifier) 125 and 126 in the HVAC apparatus 120.

The controller 190 may execute smart humidification control logic stored in the memory when the third mode or the fourth mode is determined as the operation mode. The smart humidification control logic may allow the heating wire 140 and the humidification function to be controlled in association with each other by identifying vehicle indoor and outside air conditions using the sensors 160 to prevent the moisture (fog) from being generated on the window glass during the humidification.

Specifically, the controller 190 may collect initial sensor data using the sensors 160. The controller 190 may measure the outside air temperature, the indoor temperature, the window surface temperature, and/or the indoor humidity using the AMB sensor, the in-car sensor, the ADS sensor, and/or the humidity sensor.

The controller 190 may determine humidification function operation prohibition (humidification function prohibition) based on the collected initial sensor data. When the indoor humidity exceeds a critical humidity, when the outside air temperature is out of a critical temperature range, when a sensor failure (an error) occurs, when a humidification function failure (an error) occurs, when a heating wire failure occurs, and/or when a lack of water of the humidifier occurs, the controller 190 may determine the humidification function operation prohibition.

When it is determined that the humidification function is operable, the controller 190 may stop (turn off) an auto defog system (ADS). The ADS is an apparatus that automatically removes the moisture when the moisture is sensed on a front glass (a windshield) of the vehicle during the cooling and the heating to secure a view of the driver. In addition, the controller 190 may control the power regulator 150 to adjust the amount of power supplied to the heating wire 140. The controller 190 may determine a dew point temperature based on the window surface temperature, the indoor temperature, and the indoor humidity measured by the sensors 160. The controller 190 may calculate a difference between the determined dew point temperature and the outside air temperature measured by the sensors 160, and set a target window surface temperature (a target surface temperature) based on the calculated temperature difference. The controller 190 may control the power regulator 150 to variably control the amount of power supplied to the heating wire 140 to maintain the set target surface temperature. The power regulator 150 may variably control the amount of power supplied to the heating wire 140 based on a difference between the window surface temperature and the target surface temperature.

The controller 190 may wait until the window surface temperature reaches the target surface temperature after operating the heating wire 140. The controller 190 may start the humidification of the vehicle interior when the window surface temperature reaches the target surface temperature.

The controller 190 may compare the indoor humidity with a preset target relative humidity (a target humidity) using the humidity sensor to determine whether the indoor humidity reaches the target humidity. When the indoor humidity reaches the target humidity, the controller 190 may control the indoor humidity to be maintained at the target humidity.

The controller 190 may determine whether a situation in which the target humidity and/or the target surface temperature cannot be maintained has occurred. When the situation in which the target humidity and/or the target surface temperature cannot be maintained occurs, the controller 190 may output a notification notifying this and stop the humidification operation. In addition, the controller 190 may stop the humidification operation when receiving data representing humidification function off from the user input device 170.

Figure 2:
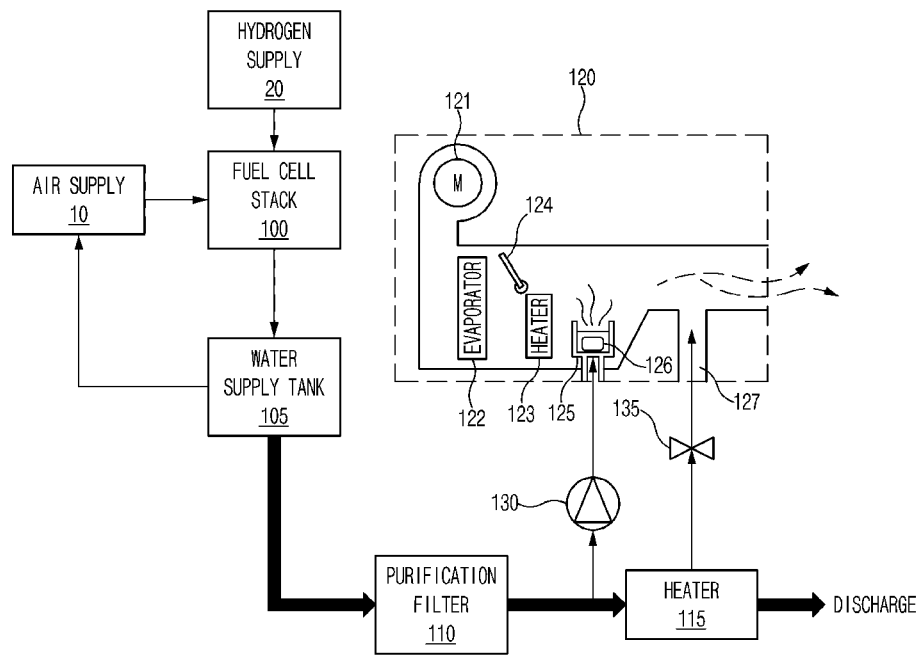
FIG. 2 is a diagram for describing a first mode of a humidification system according to embodiments of the present disclosure.

FIG. 2 is a diagram for describing a first mode of a humidification system according to embodiments of the present disclosure.

Referring to FIG. 2, when the first mode, that is, the evaporation drainage mode is determined as the operation mode of the humidification system, the water supply tank 105 may discharge the water stored in the water supply tank 105 in response to an instruction of the controller 190. When the water supply tank 105 discharges the stored water, the controller 190 may operate the purification filter 110 and the heater 115.

The purification filter 110 may purify the water discharged from the water supply tank 105 and supply the purified water to the heater 115. The heater 115 may heat the water introduced through the purification filter 110 and vaporize the water into the steam. The gas vaporized by the heater 115, that is, the steam may be discharged to the outside through the exhaust pipe.

The controller 190 may operate the heater 115 until an entirety of the water stored in the water supply tank 105 is discharged. The controller 190 may determine whether the entirety of the water in the water supply tank 105 has been discharged using the water level sensor of the water supply tank 105. The heater 115 may evaporate the entirety of the water in the water supply tank 105 to be discharged to the outside. As such, because the water generated in the fuel cell stack 100 is vaporized and discharged to the outside using the heater 115, a water drop phenomenon at a location below the vehicle may be ameliorated during the parking or the stopping.

Figure 3:
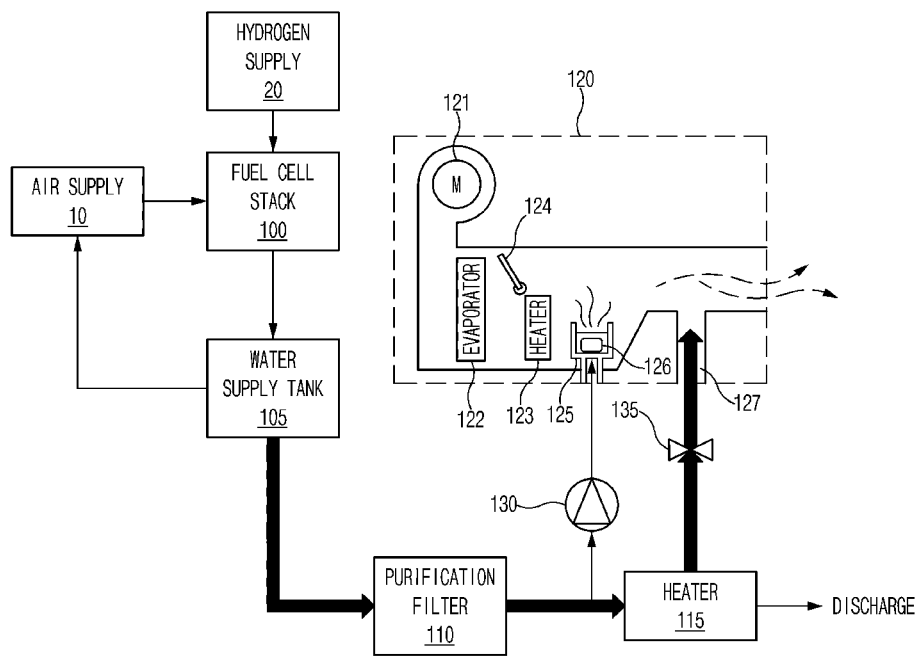
FIG. 3 is a diagram for describing a second mode of a humidification system according to embodiments of the present disclosure.

FIG. 3 is a diagram for describing a second mode of a humidification system according to embodiments of the present disclosure.

Referring to FIG. 3, when the second mode, that is, the heating humidification mode is determined as the operation mode of the humidification system, the water supply tank 105 may discharge the water collected therein. The controller 190 may operate the purification filter 110, the heater 115, and the valve 135 when discharging the water stored in the water supply tank 105.

The purification filter 110 may purify the water discharged from the water supply tank 105 and supply the purified water to the heater 115. The heater 115 may generate the steam by heating the water purified by the purification filter 110, and supply the generated steam to the HVAC apparatus 120. The steam (the vaporized gas) output from the heater 115 may flow to the inlet 127 of the HVAC apparatus 120.

The HVAC apparatus 120 may operate the motor 121 to supply the vaporized gas flowing into the inlet 127 to the interior of the vehicle to humidify the interior of the vehicle. The controller 190 may adjust a flow rate of the vaporized gas supplied to the HVAC apparatus 120 by controlling an opening rate of the valve 135.

The controller 190 may operate the heating wire 140 by controlling the power regulator 150 during the heating humidification using the heater 115. The power regulator 150 may adjust the amount of power supplied to the heating wire 140 in response to the instruction of the controller 190. Because the heating wire 140 is operated during the heating humidification as such, the moisture generated on the window may be removed by the heating humidification.

Figure 4:
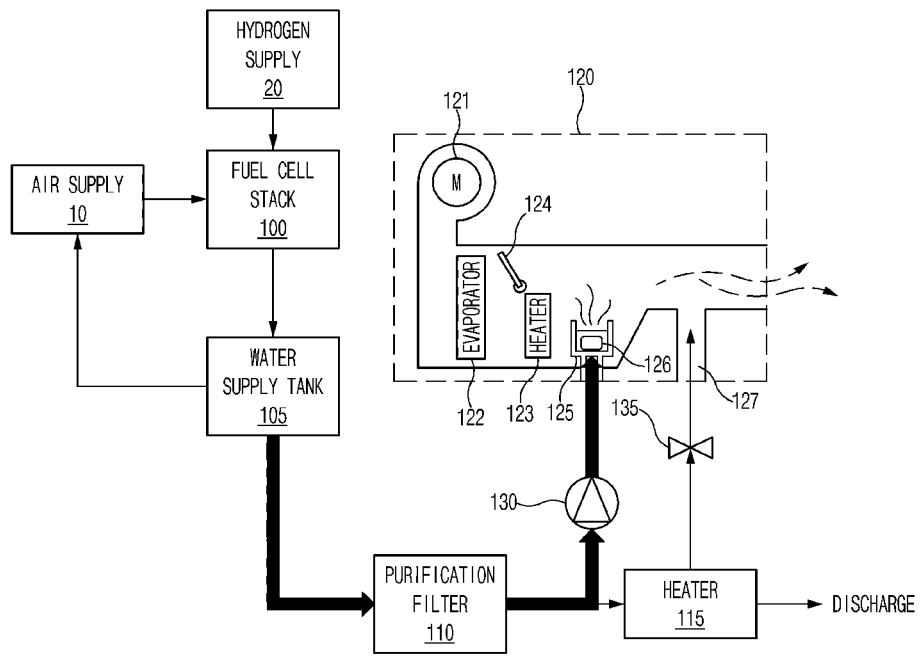
FIG. 4 is a diagram for describing a third mode of a humidification system according to embodiments of the present disclosure.

FIG. 4 is a diagram for describing a third mode of a humidification system according to embodiments of the present disclosure.

Referring to FIG. 4, when the third mode, that is, the ultrasonic humidification mode is determined as the operation mode of the humidification system, the controller 190 may discharge the water stored in the water supply tank 105 and operate the purification filter 110, the pump 130, and the ultrasonic generator 126.

The purification filter 110 may purify the water discharged from the water supply tank 105. The pump 130 may pump the water purified by the purification filter 110 and supply the purified water to the water tank 125 in the HVAC apparatus 120. That is, the pump 130 may supply the water to the ultrasonic humidifier in the HVAC apparatus 120.

The ultrasonic generator 126 may generate vibration by applying an ultrasonic wave to the water in the water tank 125, and the water may be decomposed into the water molecules (the water particles) by such vibration. The decomposed water molecules may flow into the vehicle interior by wind generated by the motor 121. In other words, the controller 190 may decompose the water in the water tank 125 by operating the ultrasonic generator 126 to humidify the interior of the vehicle. When operating in the third mode, the controller 190 may control the power regulator 150 to operate the heating wire 140. The power regulator 150 may prevent the generation of the window moisture by adjusting the amount of power supplied to the heating wire 140 in response to the instruction of the controller 190.

Figure 5:
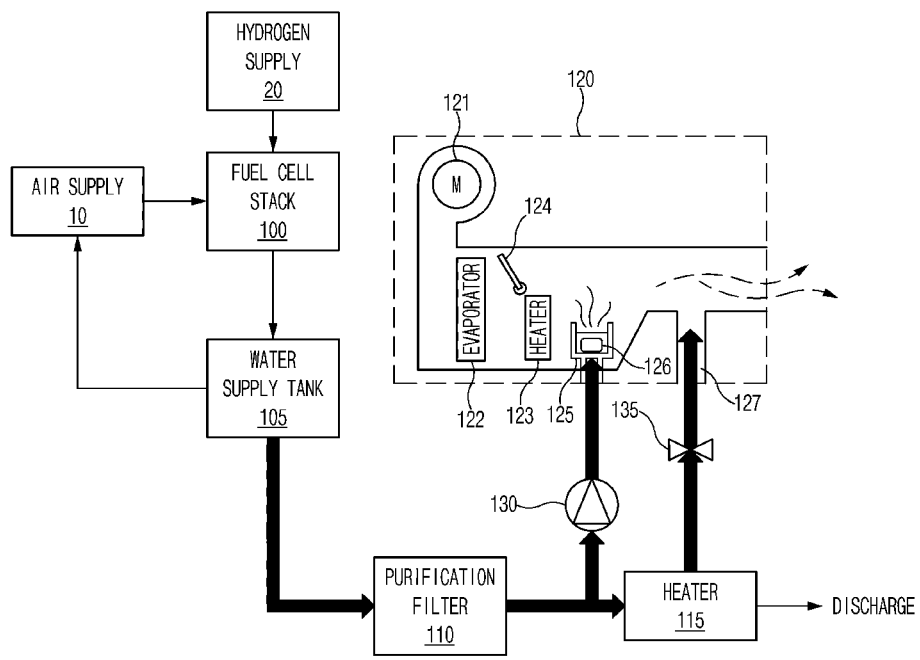
FIG. 5 is a diagram for describing a fourth mode of a humidification system according to embodiments of the present disclosure.

FIG. 5 is a diagram for describing a fourth mode of a humidification system according to embodiments of the present disclosure.

Referring to FIG. 5, when the fourth mode, that is, the hybrid humidification mode is determined as the operation mode of the humidification system, the controller 190 may discharge the water stored in the water supply tank 105 and operate the purification filter 110, the heater 115, the ultrasonic generator 126, the pump 130, and the valve 135.

The water supply tank 105 may discharge the water stored therein under the control of the controller 190. The purification filter 110 may purify the water discharged from the water supply tank 105. The heater 115 may heat and vaporize the water purified by the purification filter 110. The controller 190 may control an opening degree of the valve 135 to allow the steam vaporized by the heater 115 to flow to the inlet 127 of the HVAC apparatus 120.

In addition, the controller 190 may operate the pump 130 to supply the purified water to the water tank 125 of the ultrasonic humidifier in the HVAC apparatus 120. The controller 190 may decompose the water in the water tank 125 by operating the ultrasonic generator 126 in the water tank 125.

The controller 190 may operate the motor 121 to generate the wind. The vaporized gas (the steam) and the water molecules may flow to the vehicle interior by such wind to increase the indoor humidity. That is, the controller 190 may operate the heater 115 and the ultrasonic generator 126 at the same time to humidify the interior of the vehicle. In this connection, the controller 190 may set a ratio of an amount of heating-type humidification and an amount of ultrasonic-type humidification based on an input of the user input from the user input device 170. When the humidification amount ratio is not selected by the user, the controller 190 may adjust the amount of heating-type humidification and the amount of ultrasonic-type humidification based on a predetermined default ratio (e.g., 1:5).

When operating in the fourth mode, the controller 190 may operate the heating wire 140 by controlling the power regulator 150. The power regulator 150 may prevent the generation of window moisture by adjusting the amount of power supplied to the heating wire 140 in response to the instruction of the controller 190.

Figure 6:
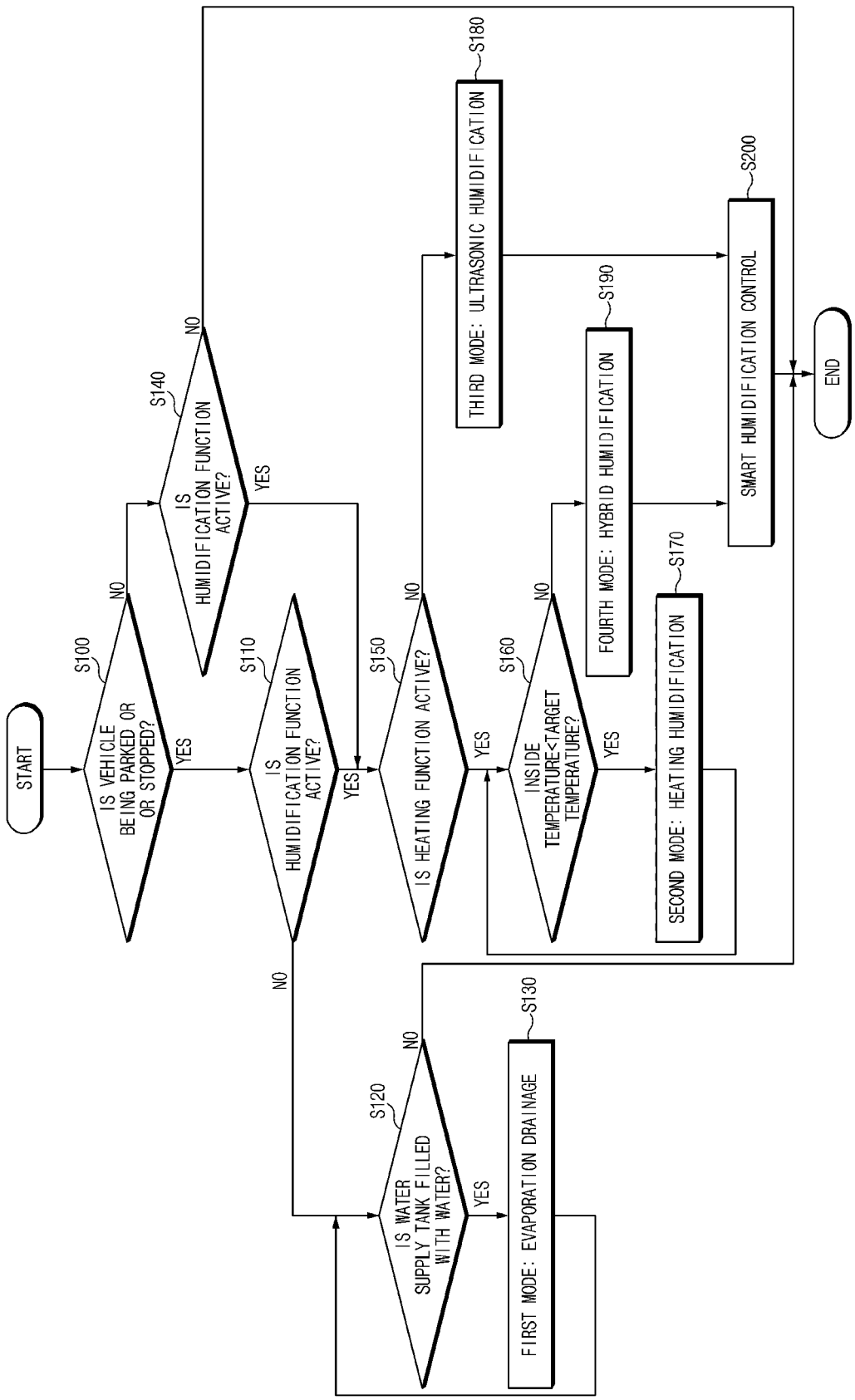
FIG. 6 is a flowchart illustrating a method for humidifying a fuel cell electric vehicle according to embodiments of the present disclosure.

FIG. 6 is a flowchart illustrating a method for humidifying a fuel cell electric vehicle according to embodiments of the present disclosure.

The controller 190 may determine whether the vehicle is being parked or stopped (S100). The controller 190 may determine whether the vehicle is being parked or stopped in a situation in which power is supplied to the vehicle (e.g., the accessory power ON or the vehicle power ON). In other words, the controller 190 may determine whether the vehicle is parked or stopped based on status information of the start button and the shift stage. For example, when the start button is in the accessory power ON state and the shift stage is in the P-stage, the controller 190 may determine that the vehicle is 'being parked and stopped'.

The controller 190 may determine whether the humidification function is active when the vehicle is being parked or stopped (S110). The controller 190 may determine whether the humidification function is active based on a status of a humidification button of the user input device 170. For example, when the humidification button is pressed, the controller 190 may determine that the humidification function is in the active state. In addition, when the humidification button is not pressed, the controller 190 may determine that the humidification function is in the inactive state.

When the humidification function is inactive, the controller 190 may determine whether the water supply tank 105 is filled with the water (S120). When the humidification function is identified to be in the inactive state while the vehicle is being parked or stopped in the accessory power ON or the vehicle power ON state, the controller 190 may measure the amount of water (the water level) stored in the water supply tank 105 using the water level sensor installed in the water supply tank 105. The controller 190 may compare the measured amount of water with the predetermined reference value, and determine that the water supply tank 105 is filled with the water when the measured amount of water exceeds the reference value.

When the water supply tank 105 is filled with the water, the controller 190 may determine the first mode, that is, the evaporation drainage mode as the operation mode of the humidification system (S130). When the first mode is determined as the operation mode, the controller 190 may operate the heater 115 and supply the water stored in the water supply tank 105 to the heater 115. The heater 115 may heat the water supplied from the water supply tank 105 under the control of the controller 190 and discharge the vaporized steam to the outside. The controller 190 may operate the heater 115 until the entirety of the water stored in the water supply tank 105 is discharged. The controller 190 may continuously identify the water level of the water supply tank 105 through the water level sensor of the water supply tank 105. The controller 190 may stop the evaporation drainage using the heater 115 when the water level of the water supply tank 105 falls to be equal to or lower than a preset reference water level.

When it is determined in S100 that the vehicle is not being parked or stopped, the controller 190 may determine whether the humidification function is active (S140). In other words, the controller 190 may determine whether the humidification function is active when the vehicle is traveling.

When it is identified in S110 or S140 that the humidification function is in the active state, the controller 190 may determine whether the heating function is active (S150). The controller 190 may determine whether the heating function is operated based on whether a heating button of the user input device 170 is manipulated. When the heating button is manipulated, the controller 190 may determine that the heating function is in the active state. When the heating button is not manipulated, the controller 190 may determine that the heating function is in the inactive state.

When the heating function is in the active state, the controller 190 may determine whether the indoor temperature is lower than the target temperature (S160). The controller 190 may measure the indoor temperature of the vehicle using the sensors 160 when the heating function is being operated. The controller 190 may determine whether the indoor temperature is lower than the target temperature by comparing the measured indoor temperature with the target temperature stored in the memory (not shown). The target temperature may be set variable by the user.

When it is identified in S160 that the indoor temperature is lower than the target temperature, the controller 190 may determine the second mode, that is, the heating humidification mode as the operation mode (S170). When the second mode is determined as the operation mode, the controller 190 may operate the heater 115 and supply the water stored in the water supply tank 105 to the heater 115. The heater 115 may heat the water supplied from the water supply tank 105 and supply the gas (the steam) vaporized by the heating to the HVAC apparatus 120. Because the HVAC apparatus 120 supplies the vaporized gas into the vehicle, the indoor humidity and the indoor temperature of the vehicle may be adjusted. As such, because the warm steam is supplied into the vehicle using the heater 115, the vehicle interior may be humidified and the heating may be assisted. The controller 190 may continuously identify the indoor temperature using the in-car sensor, and may switch the operation mode from the second mode to the fourth mode when the indoor temperature reaches the target temperature.

When it is identified in S150 that the heating function is inactive, the controller 190 may determine the third mode, that is, the ultrasonic humidification mode as the operation mode (S180). The third mode is a mode that executes the humidification because the water in the water tank 125 is decomposed by operating the ultrasonic generator 126 of the HVAC apparatus 120 and the decomposed water is supplied into the vehicle.

When the indoor temperature is equal to or higher than the target temperature in S160, the controller 190 may determine the fourth mode, that is, the hybrid humidification mode as the operation mode (S190). The fourth mode is a mode that performs the heating-type humidification and the ultrasonic-type humidification at the same time by operating the heater 115 and the ultrasonic generator 126 of the HVAC apparatus 120.

When the third mode and the fourth mode are determined as the operation mode, the controller 190 may perform smart humidification control (S200). The smart humidification control refers to control in which the heating wire 140 installed on the window and the operation of the humidification function are in association with each other by identifying the vehicle indoor and outside air conditions using the sensors 160 to prevent the moisture from being generated on the window during the humidification.

Figure 7:
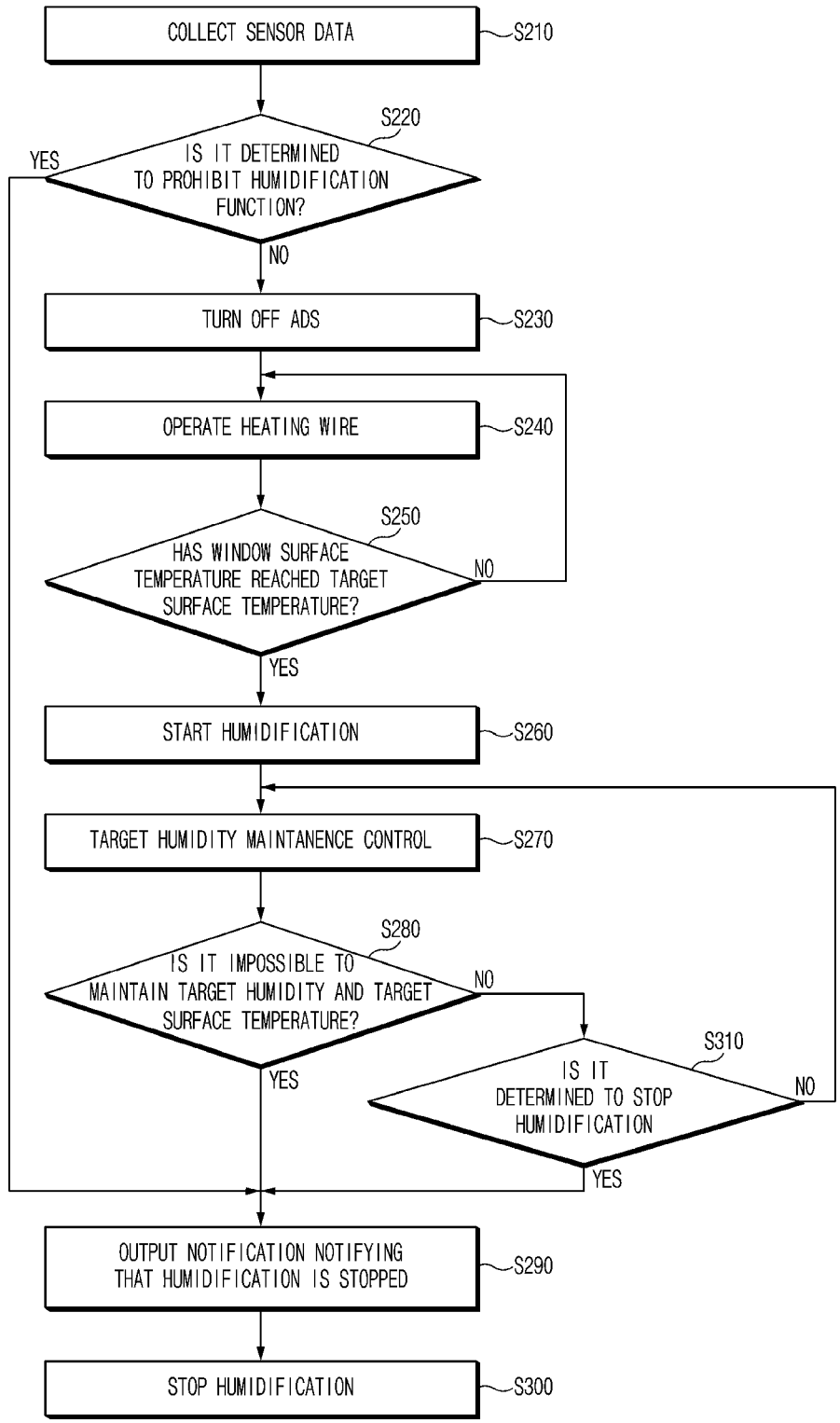
FIG. 7 is a flowchart showing a smart humidification control method according to embodiments of the present disclosure.

FIG. 7 is a flowchart showing a smart humidification control method according to embodiments of the present disclosure.

The controller 190 may collect sensor data at the start of the smart humidification control (S210). The controller 190 may collect the initial sensor data measured by the sensor 160 in the state in which the humidification function and the heating wire 140 are not operated. The controller 190 may measure the outside air temperature, the window surface temperature, the indoor temperature, the indoor humidity, and the like using the AMB sensor, the ADS sensor, the in-car sensor, the humidity sensor, and the like.

The controller 190 may determine whether to prohibit the humidification function based on the collected sensor data (S220). When it is determined that the situation such as the case in which the indoor humidity exceeds the predetermined critical humidity, the case in which the outside air temperature is out of the predetermined critical temperature range, the case in which the sensors 160 fail, the case in which the heating wire 140 fails, and/or the case in which the water for the humidification is insufficient has occurred, the controller 190 may determine the prohibition of the operation of the humidification function.

The controller 190 may stop (turn off) the ADS when the humidification function prohibition is not determined (S230). When it is determined that the operation of the humidification function is possible, the controller 190 may stop a dehumidification function using the ADS. When the ADS is operated at the same time as the operation of the humidification function, the humidification and dehumidification may operate at the same time, which may cause a control conflict. Thus, unnecessary energy may be consumed and an abnormal increase in the indoor temperature and humidity may be caused. Therefore, when it is determined to start the operation of the humidification function, the ADS may be stopped.

The controller 190 may operate the heating wire 140 after the ADS is stopped (S240). The controller 190 may control the power regulator 150 to apply a maximum amount of power to the heating wire 140 when the heating wire 140 is operated.

The controller 190 may determine whether the window surface temperature has reached the target surface temperature (S250). The controller 190 may continuously measure the window surface temperature using the ADS sensor, and compare the measured window surface temperature with the target surface temperature. The controller 190 may determine whether the window surface temperature has reached the target surface temperature based on the comparison result.

The controller 190 may instruct the power regulator 150 to apply the maximum amount of power to the heating wire 140 until the window surface temperature reaches the target surface temperature before operating the humidification function. In other words, when the window surface temperature is lower than the target surface temperature, the controller 190 may apply the maximum amount of power to the heating wire 140. When the window surface temperature is higher than the target surface temperature, the controller 190 may apply a minimum amount of power to the heating wire 140 or allow the heating wire 140 to be maintained in a non-operational state. The target surface temperature may be set based on the dew point temperature corresponding to the indoor temperature and the indoor relative humidity (the indoor humidity) and the outside air temperature. The controller 190 may measure the indoor temperature and the indoor humidity using the in-car sensor and the humidity sensor, and determine the dew point temperature based on the measured indoor temperature and indoor humidity with reference to the pre-stored lookup table. The controller 190 may calculate the temperature difference between the determined dew point temperature and the outside air temperature measured by the AMB sensor. The controller 190 may determine the amount of power to be supplied to the heating wire 140 based on the calculated temperature difference. In addition, the controller 190 may determine the target surface temperature based on the calculated temperature difference.

For example, when the indoor temperature is 25° C. and the indoor humidity is 50%, the controller 190 may determine the dew point temperature to about 13° C. The controller 190 may calculate a difference of 10° C. between the dew point temperature and the outside air temperature. The controller 190 may set the target surface temperature to 18° C. (=dew point temperature+5° C.) based on the difference between the dew point temperature and the outside air temperature. The controller 190 may supply the maximum amount of power to the heating wire 140 until the window surface temperature reaches the target surface temperature.

As another example, when the dew point temperature is 13° C. and the outside air temperature is −10° C., the controller 190 may set the target surface temperature to 23° C. (=dew point temperature+10° C.). The controller 190 may supply the maximum amount of power to the heating wire 140 until the window surface temperature reaches the target surface temperature.

As another example, when the indoor temperature is 22° C. and the relative humidity is 30%, the controller 190 may determine the dew point temperature to about 3.5° C. with reference to the pre-stored lookup table. The controller 190 may calculate a difference of 10° C. between the determined dew point temperature and the outside air temperature. The controller 190 may determine the target surface temperature to 8.5° C. (=dew point temperature+5° C.) based on the difference between the dew point temperature and the outside air temperature. When the outside air temperature is higher than the target surface temperature, the controller 190 may not operate the heating wire 140 or may supply the minimum amount of power to the heating wire 140.

When the window surface temperature reaches the target surface temperature, the controller 190 may variably control the amount of power supplied to the heating wire 140 such that the window surface temperature is maintained at the target surface temperature.

As described above, before operating the humidification function of the vehicle, the heating wire 140 installed on the window is operated to increase the window surface temperature to be equal to or higher than the dew point temperature, so that the window moisture caused by the operation of the humidification function may be prevented.

The controller 190 may start the humidification when the window surface temperature reaches the target surface temperature (S260). The controller 190 may delay the humidification operation in the third mode or the fourth mode until the window surface temperature reaches the target surface temperature. A delay time may vary depending on an external environmental condition, a travel situation (e.g., a vehicle speed), the indoor temperature, the outside air temperature (an outdoor temperature), and the like. The controller 190 may calculate a time it takes for the initial window surface temperature to reach the target surface temperature (e.g., the dew point temperature) based on a pre-stored glass temperature increase speed for each outside air temperature, and utilize the calculated time as a humidification ON delay time.

The controller 190 may perform proportional integral derivative (PID) control such that the indoor humidity of the vehicle reaches the target humidity (a relative humidity amount) set by the user using the humidity sensor. When the user selects automatic control, the controller 190 may perform the PID control such that the indoor humidity is maintained at an optimum humidity (e.g., 40% to 50%). The target humidity may be limited to be within a range from 30% to 60% set by the user.

The controller 190 may perform selective control based on an initial indoor temperature when activating the humidification mode. For example, when the initial indoor temperature of the vehicle is low, for example, within a range from 10 to 15° C. or lower, the indoor humidity (the relative humidity) may be measured to be high because a saturated steam amount of the air is low. Accordingly, the controller 190 may maintain a humidification stop state without starting the humidification immediately. As another example, when the initial indoor temperature of the vehicle is appropriate (e.g., within a range from 15 to 20° C.), the controller 190 may start the humidification immediately when a current indoor humidity is lower than the target humidity. On the other hand, the controller 190 may maintain the humidification stop state when the current indoor humidity is higher than the target humidity.

The controller 190 may control the indoor humidity of the vehicle to be maintained at the target humidity (S270). The controller 190 may perform target humidity maintenance control based on the indoor temperature of the vehicle. For example, when the indoor humidity is higher than the target humidity in the situation in which the indoor temperature is lower than the target temperature, the controller 190 may wait until the indoor humidity naturally decreases as the indoor temperature rises, and may start the humidification from a time point at which the current indoor humidity becomes lower than the target humidity. On the other hand, when the indoor humidity is lower than the target humidity in the situation in which the indoor temperature is lower than the target temperature, the controller 190 may start the humidification immediately regardless of whether the indoor temperature has reached the target temperature.

As another example, in the situation in which the indoor temperature exceeds the target temperature, the controller 190 may stop the humidification until the indoor temperature reaches the target temperature by performing the cooling. The controller 190 may start the humidification when the indoor temperature reaches the target temperature. In addition, in the situation in which the indoor temperature exceeds the target temperature, when the indoor temperature is lowered to the target temperature only by inflow of the outside air, the controller 190 may start the humidification when the indoor temperature reaches 'target temperature+5° C.'.

As another example, when the indoor temperature and the target temperature match each other, the controller 190 may adjust an amount of humidification to maintain the indoor humidity at the target humidity. In other words, the controller 190 may maintain the indoor humidity at the target humidity by adjusting the amount of humidification in the vehicle after the indoor temperature reaches the target temperature.

As another example, when the target temperature is out of the appropriate temperature range (e.g., from 15 to 20° C.), the controller 190 may stop the humidification and output a notification notifying that the humidification is stopped. For example, when the user manually set 'max warm' and 'blower max', the indoor temperature is able to reach a temperature range from 30 to 40° C. or a higher temperature. Thus, when the indoor humidity is controlled to be in the range from 40% to 50% or higher, the vehicle interior may become excessively hot and humid, so that the controller 190 may stop the humidification. In addition, when the user manually sets 'max cool' and the 'blower max' or sets 'FATC Auto' and sets the target temperature very low, even when the humidification is performed, the dehumidification may occur because of the cooling operation, so that the controller 190 may stop the humidification.

When it is difficult to maintain the target humidity even when the amount of humidification reaches minimum or maximum, the controller 190 may maintain the target humidity through cooperative control with apparatuses capable of adjusting the humidity. For example, when it is difficult to maintain the target humidity even when the maximum amount of humidification is reached, for example, when an inflow amount of outside air is excessive and dry air is excessively introduced into the vehicle, the controller 190 may maintain the maximum amount of humidification, and increase a mixing amount of interior air (inside air) of an inlet door of the HVAC apparatus 120 that determines the inflow amount of outside air, thereby controlling to follow the target humidity. In addition, the controller 190 may minimize the mixing amount of inside air of the inlet of the HVAC apparatus 120, and increase or decrease the amount of humidification, thereby controlling to follow the target humidity.

As another example, when it is difficult to maintain the target humidity even when the minimum amount of humidification is reached or even when in an off state (the humidification stop state), for example, when the indoor humidity is high, and thus, the humidification is not required and the dehumidification is required, an outside air intake amount of the HVAC apparatus 120 may be set to 100%. When outside air intake control is not enough, an air conditioner may be operated.

The controller 190 may determine whether it is impossible to maintain the target humidity and the target surface temperature (S280).

The controller 190 may output a notification notifying that the humidification is stopped when it is impossible to maintain the target humidity and the target surface temperature (S290).

The controller 190 may stop the humidification while outputting the humidification stop notification (S300).

The controller 190 may determine whether to stop the humidification even when the target humidity and the target surface temperature may be maintained (S310). When receiving a humidification stop command from the user input device 170, the controller 190 may determine to stop the humidification.

When it is determined to stop the humidification, the controller 190 may output the humidification stop notification (S290), and may stop the humidification (S300). In addition, when it is determined in S220 to prohibit the humidification, the controller 190 may output a notification notifying the prohibition of the humidification function (S290) and stop the humidification (S300). When the humidification function operation prohibition is determined, the controller 190 may output the notification notifying the humidification function operation prohibition on the cluster without operating the heating wire 140 and the humidification function. Conditions for prohibiting the operation of the humidification function may be indoor and outdoor environmental conditions of the vehicle, such as the case in which the indoor humidity exceeds the critical humidity or the case in which the outside air temperature is out of the predetermined temperature range, and situations in which normal operation of various sensors, a water supply, and the like is impossible. For example, when the indoor temperature exceeds 30° C. and the indoor humidity exceeds 90%, the controller 190 may determine that indoor humidification is unnecessary, and thus determine the prohibition of the operation of the humidification function. In addition, when the outside air temperature is lower than −30° C., the controller 190 may determine that a normal humidification operation is difficult because the outside air temperature is too low, and determine to prohibit the operation of the humidification function. In addition, when it is determined that the target surface temperature is not able to be reached even when the maximum amount of power is supplied to the heating wire 140 or when the sensor 160, the ultrasonic generator 126, the heater 115, and/or the heating wire 140 are not able to be used because of the failure (the error), the controller 190 may determine to prohibit the operation of the humidification function.

Figure 8:
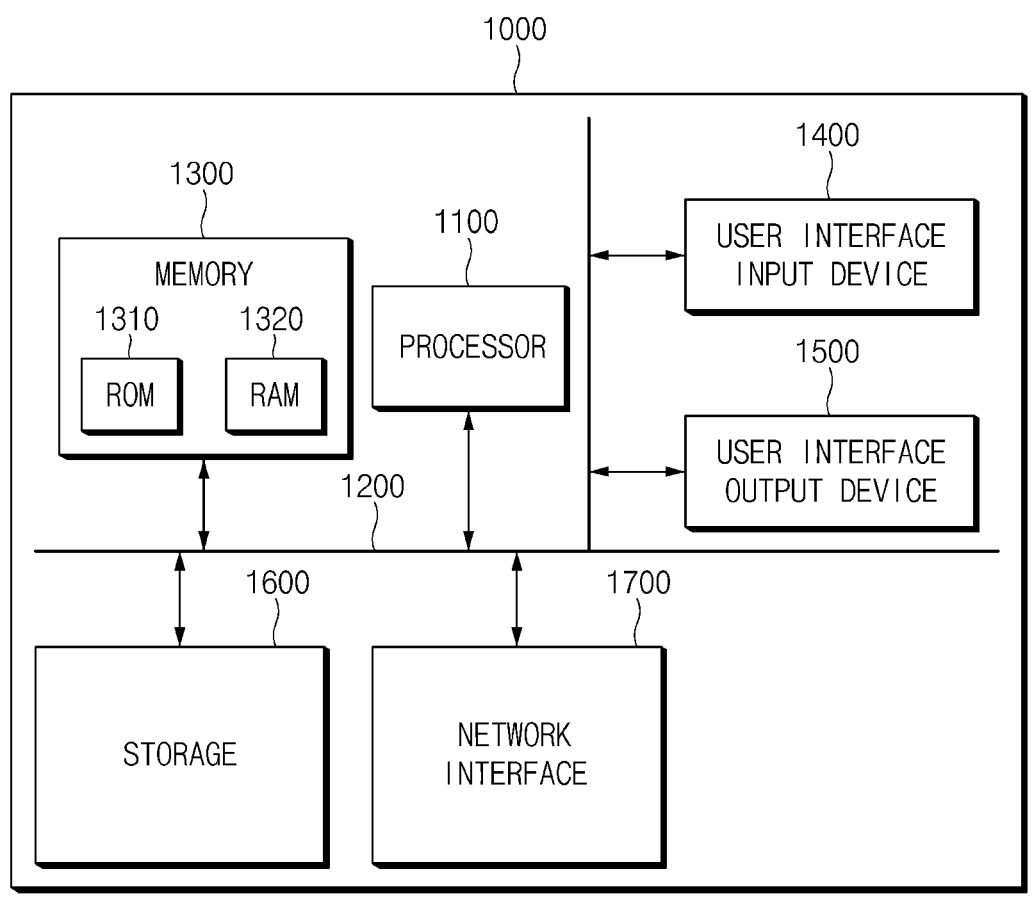
FIG. 8 is a block diagram showing a computing system executing a method for humidifying a fuel cell electric vehicle according to embodiments of the present disclosure.

FIG. 8 is a block diagram showing a computing system executing a method for humidifying a fuel cell electric vehicle according to embodiments of the present disclosure.

With reference to FIG. 8, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, because the indoor humidity of the vehicle is controlled using the water generated during the electricity generation in the fuel cell stack, water replenishing for the humidification is not performed, thereby providing convenience to the user.

In addition, according to the present disclosure, because the heating wire installed on the window glass is controlled in the associated manner during the vehicle interior humidification, the indoor humidity of the vehicle may be adjusted and the fogging of the window glass resulted from the temperature difference between the interior and the outdoor of the vehicle may be fundamentally blocked.

In addition, according to the present disclosure, because the heater is used to heat the water generated in the fuel cell and discharge the steam, the water drop phenomenon at the location below the vehicle during the parking or the stopping may be ameliorated and the vehicle indoor humidification may be supported.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for humidifying a vehicle, the system comprising:
a fuel cell stack for producing electrical energy through an electrochemical reaction of hydrogen and oxygen;
a water supply tank for storing water generated during electricity generation in the fuel cell stack;
a first humidifier for humidifying an interior of the vehicle using the water supplied from the water supply tank;
a heating apparatus for applying heat to a vehicle glass; and
a controller configured to perform anti-fogging control of the vehicle glass using the heating apparatus when humidifying the interior of the vehicle;
wherein the controller is further configured to:
determine a target surface temperature based on a difference between a dew point temperature and an outside air temperature;
measure a window surface temperature using a surface temperature sensor after operating the heating apparatus;
compare the window surface temperature with the target surface temperature; and
start humidification of the interior of the vehicle at a time point when the window surface temperature reaches the target surface temperature.

2. The system of claim 1, wherein the heating apparatus includes:
a transparent heating wire installed on each window glass of the vehicle to generate heat; and
a power regulator for adjusting an amount of power supplied to the heating wire.

3. The system of claim 2, wherein the controller is configured to variably control the amount of power supplied to the heating wire based on a difference between the window surface temperature and the target surface temperature.

4. The system of claim 2, wherein the controller is configured to:
collect initial sensor data using at least one of an outside air temperature sensor, an indoor temperature sensor, a surface temperature sensor, or a humidity sensor;
determine prohibition of operation of a humidification function based on the sensor data; and
output a notification notifying that the operation of the humidification function is prohibited when it is determined to prohibit the operation of the humidification function.

5. The system of claim 4, wherein the controller is configured to stop an auto defog system, operate the heating wire, and supply a maximum amount of power when the prohibition of the operation of the humidification function is not determined.

6. The system of claim 1, wherein the first humidifier includes:
a water tank for storing the water supplied from the water supply tank; and
an ultrasonic generator for generating an ultrasonic wave to decompose the water stored in the water tank.

7. The system of claim 1, further comprising:
a second humidifier for humidifying the interior of the vehicle in a second humidification scheme different from a first humidification scheme of the first humidifier,
wherein the second humidifier includes a heater for heating the water supplied from the water supply tank to generate steam.

8. The system of claim 7, wherein the controller is configured to:
determine an operation mode of the system based on at least one of a vehicle state, a heating, ventilation, and air conditioning (HVAC) apparatus state, or an indoor temperature of the vehicle; and
adjust an indoor humidity of the vehicle by controlling at least one of the first humidifier or the second humidifier based on the determined operation mode.

9. The system of claim 8, wherein the controller is configured to:
determine an evaporation drainage mode as the operation mode when a humidification function is in an inactive state during parking and stopping and a water level of the water supply tank exceeds a reference water level; and
operate the second humidifier to discharge vaporized steam to the outside.

10. The system of claim 8, wherein the controller is configured to:
determine a heating humidification mode as the operation mode when a humidification function and a heating function are in an active state and the indoor temperature is lower than a target temperature; and
operate the second humidifier to supply vaporized steam to the interior of the vehicle.

11. The system of claim 8, wherein the controller is configured to:
determine an ultrasonic humidification mode as the operation mode when a humidification function is in an active state and a heating function is in an inactive state; and
operate the first humidifier to humidify the interior of the vehicle.

12. The system of claim 8, wherein the controller is configured to:
determine a hybrid humidification mode as the operation mode when a humidification function is in an active state and the indoor temperature is equal to or higher than a target temperature; and
operate the first humidifier and the second humidifier to humidify the interior of the vehicle.

13. The system of claim 1, wherein the controller is configured to adjust at least one of a humidification time point or a humidification amount based on an indoor temperature of the vehicle.

14. The system of claim 1,
wherein the controller is configured to perform control in association with a humidity adjustable apparatus of a heating, ventilation, and air conditioning (HVAC) apparatus when an indoor humidity is not able to be maintained at a target humidity by supplying a maximum or minimum amount of humidification,
wherein the humidity adjustable apparatus includes at least one of an inlet door or an air conditioner.

15. A method for humidifying a vehicle equipped with a humidification system including a water supply tank for storing water generated during electricity generation in a fuel cell stack, a first humidifier for receiving the water from the water supply tank and humidifying an interior of the vehicle, and a heating apparatus for applying heat to a vehicle glass, the method comprising:
controlling, by a controller, humidification of the interior of the vehicle; and
performing, by the controller, anti-fogging control of the vehicle glass using the heating apparatus when controlling the humidification,
wherein the performing of the anti-fogging control of the vehicle glass includes:
operating a heating wire installed on each window glass of the vehicle;
measuring a window surface temperature using a surface temperature sensor after operating the heating wire;
comparing the window surface temperature with a target surface temperature, and
starting the humidification of the interior of the vehicle when the window surface temperature reaches the target surface temperature.

16. The method of claim 15, wherein the performing of the anti-fogging control of the vehicle glass further includes:
variably controlling an amount of power supplied to the heating wire based on a difference between the window surface temperature and the target surface temperature.

17. The method of claim 16, wherein the operating of the heating wire includes:
collecting initial sensor data using at least one of an outside air temperature sensor, an indoor temperature sensor, a surface temperature sensor, or a humidity sensor;
determining prohibition of operation of a humidification function based on the sensor data;
stopping an auto defog system when the operation of the humidification function is permitted; and
supplying a maximum amount of power to the heating wire after the auto defog system is stopped.

18. The method of claim 15, wherein controlling the humidification of the interior of the vehicle includes:
operating a second humidifier using a second humidification scheme different from a first humidification scheme of the first humidifier to humidify the interior of the vehicle when a humidification function and a heating function are in an active state and an indoor temperature is lower than a target temperature;
operating the first humidifier to humidify the interior of the vehicle when the humidification function is in the active state and the heating function is in an inactive state; and
operating the first humidifier and the second humidifier to humidify the interior of the vehicle when the humidification function is in the active state and the indoor temperature is equal to or higher than the target temperature.

19. The method of claim 15, wherein controlling the humidification of the interior of the vehicle includes:
controlling an indoor humidity of the vehicle to be maintained at a target humidity by adjusting a humidification time point and an amount of humidification based on an indoor temperature of the vehicle.

* * * * *